United States Patent [19]

Busch

[11] 3,760,112

[45] Sept. 18, 1973

[54] PARTY AND COIN DETECTION ARRANGEMENT FOR A COMMUNICATION SWITCHING SYSTEM

[75] Inventor: John Edward Busch, Clarendon Hills, Ill.

[73] Assignee: GTE Automatic Electric Laboratories Incorporated, Northlake, Ill.

[22] Filed: Feb. 18, 1972

[21] Appl. No.: 227,580

[52] U.S. Cl. ............ 179/17 A, 179/6.3 R, 179/18 J

[51] Int. Cl. ............................................. H04q 5/02

[58] Field of Search ........... 179/17 A, 17 R, 18 EB, 179/18 J, 6.3 R

[56] References Cited

UNITED STATES PATENTS

| | | | |
|---|---|---|---|
| 3,278,693 | 10/1966 | Sherstiuk | 179/6.3 RX |
| 3,676,602 | 7/1972 | Goetchius et al. | 179/17 A |

*Primary Examiner*—Thomas W. Brown
*Attorney*—Kurt Mullerheim et al.

[57] ABSTRACT

A register-sender common control communication switching system having a plurality of registers sharing common memory and logic circuits on a time division multiplex basis and having a plurality of register junctors individually associated with the registers for connection to calling lines to receive signals therefrom includes a party and coin detection arrangement for identifying the calling party of a two party line and for identifying a coin deposit at a paystation. The arrangement includes a switching device in each one of the register junctors for connecting a source of current for a predetermined time interval to one side of a calling line to charge the ringer capacitors and line capacitance connected thereto to the potential of the source prior to connecting a sensitive indicating device to such a side of the calling line to respond to a detection signal supplied thereover indicative of one party of a two party line, or alternatively of a coin deposit at a paystation, and a second switching device for connecting the indicating device to that same side of the line at the end of the time interval so that the capacitance cannot cause a momentary erroneous actuation of the indicating device due to a transient discharge thereof in the absence of the detection signal since the capacitance is fully charged before the indicating device is connected to the line.

20 Claims, 10 Drawing Figures

PARTY AND COIN DETECTION ARRANGEMENT FOR A COMMUNICATION SWITCHING SYSTEM

BACKGROUND OF THE INVENTION

1. Field of the Invention

This invention relates to an arrangement in a communication switching system for detecting signals indicative of one party of a two party line, or alternatively, of the deposit of a sufficient number of coins at a paystation; and it more particularly relates to such an arrangement for a register-sender common control system having a plurality of registers sharing common memory and logic circuits on a time division multiplex basis and having a plurality of register junctors individually associated with the registers for connection to calling lines to receive signals therefrom.

2. Description of the Prior Art

Telephone switching systems have included detection arrangements to identify the calling party of a two party line by connecting a sensitive test relay to the tip side of the line upon the initiation of a call to respond to a ground potential connected to the tip side of the line at the calling subscriber's subset. The detection arrangement is also adapted to identify a ground potential, which is connected to one side of the calling line when a coin deposit is made at a paystation.

A party and coin detection arrangement is disclosed in U.S. Pat. No. 3,301,963 issued Jan. 31, 1967 to David Kwok Kang Lee and Howard L. Wirsing for a REGISTER-SENDER ARRANGEMENT FOR A COMMUNICATION SWITCHING SYSTEM COMMON CONTROL ARRANGEMENT. As disclosed therein (col. 14 and 15), a register-sender telephone switching system having a plurality of register junctors individually associated with a plurality of time division multiplex registers is provided with a party and coin detection arrangement which includes a plurality of test relays individually associated with each one of the register junctors for detecting a ground potential connected to the tip side of the calling line to operate the relay when a test is to be performed. The ground potential on the tip lead is a signal indicating that party number two of a two party line has initiated a call, or alternatively, indicating that a sufficient number of coins has been deposited where a paystation is connected to the calling line. However, the sensitive test relay can operate momentarily due to a transient discharge of ringer capacitors and of line capacitance upon connecting the relay to the tip side of the line, whereby false indications would be produced. Therefore, in order to overcome this problem, the arrangement disclosed in U.S. Pat. No. 3,301,963 includes a slow-to-operate relay to provide a 20 millisecond delay interval, which is equal to two time slots of the common control equipment, to permit any transients to decay before returning a signal to the common equipment. Thereafter, a second delay interval of two or three additional time slots immediately following the first delay interval is required to insure that a monentarily operated relay restores before the common equipment makes its determination of whether or not the test relay has identified the presence of the ground signal, whereby a total time of about four or five time slots is required to complete the test. Therefore, it would be highly desirable to have a party and coin detection arrangement which correctly identifies the presence of a signal ground in a substantially shorter period of time, so as to meet worst case conditions of a fast dial. Moreover, since the test relay must be a sensitive relay to detect the presence of the ground signal over long lines but not too sensitive to prevent accidental operation due to line leakage resistance, it would be desirable to have such an arrangement which includes a test relay requiring less critical design tolerances. In the arrangement of the foregoing patent, other critical design requirements are imposed on the test relay in that, if accidentally momentarily operated, it must release before the common equipment makes a determination of the state of the relay. Therefore, it would also be highly desirable to eliminate or at least minimize this critical design requirement.

SUMMARY OF THE INVENTION

The object of this invention is to provide a new and improved party and coin detection arrangement for a communication switching system, which arrangement completes an accurate detection in a shorter period of time and eliminates the necessity of an overly critical design requirement for a sensitive test relay, while providing a high degree of accuracy.

According to the invention, an arrangement in a register-sender common-control communication switching system connects a source of current to the tip side of a calling line to charge the ringing cpacitors and the line capacitance to the potential of the source for a predetermined time interval prior to connecting to the tip side of the calling line a sensitive test relay adapted to respond to a detection signal and includes a switching device which connects the relay to the tip side of the line at the end of the predetermined time interval. In this manner, an accurate detection can be made in that there is eliminated the possibility of a momentarily and erroneously actuated relay due to a transient discharge of the capacitance in the absence of a detection signal since the capacitance is fully charged at the time of connecting the test relay to the tip side of the line. In the disclosed embodiment of the present invention, two time slots of the time division multiplex registers are required to permit the capacitance to be fully charged, and then a time delay interval of only one time slot is required to permit the test relay to operate, thereby providing a savings in time of as much as two time slots as compared to the prior art arrangement. By charging the capacitance prior to connecting the relay to the line, ideal line conditions are presented to the relay and therefore an overly sensitive relay is not required, so that the cost of the relay is minimized. Moreover, since there is no requirement to wait for a momentarily operated relay to restore, the design requirements for the test relay are less critical, whereby the cost of the relay is reduced accordingly. Other features of the invention relate to the provision of charging the line capacitance and ringing capacitors through the windings of the dial pulse repeating relay to limit the charging current (or fault currents if the test relay is connected to a grounded line), thereby eliminating the necessity of providing an extra currentlimiting resistor.

CROSS-REFERENCES TO RELATED APPLICATIONS

The special dial pulse repeating relay, the windings of which also serve as the current limiting resistance, is disclosed in detail in U.S. Pat. 3,492,613 issued Jan. 27, 1970 by H. W. Van Husen for REED RELAYS HAV- ING AIDING COILS TO COUPLE HIGHLY INDUCTIVE OPERATING COILS TO REED BLADES, hereinafter referred to as the BATTERY FEED RELAY patent.

The preferred embodiment of the present invention is incorporated in a DATA PROCESSOR WITH CYCLIC SEQUENTIAL ACCESS TO MULTIPLEXED LOGIC AND MEMORY, U.S. patent application Ser. No. 201,851, filed Nov. 24, 1971 by S.E. Puccini, this application being hereinafter referred to as the REGISTER-SENDER application.

DESCRIPTION OF THE PREFERRED EMBODIMENT

The subsystem in which the invention is incorporated is described in said REGISTER-SENDER patent application. FIGS. 1, 2, 4 and 6 herein correspond to FIGS. 10, 2, 8 and 18, respectively, in that application, which may be referred to for further description.

Figure 1:
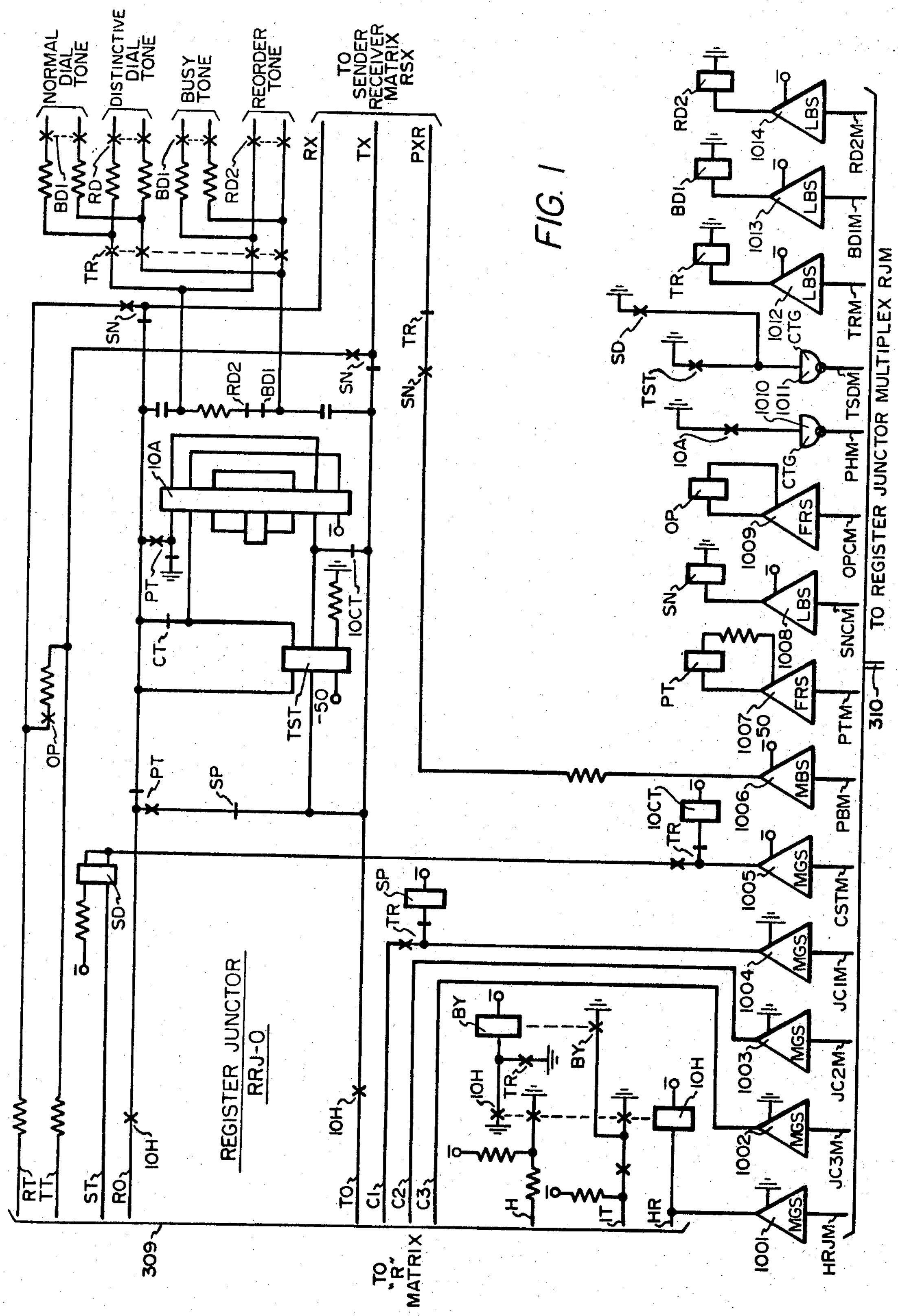
FIG. 1 is a schematic and functional block diagram of a register junctor incorporating the preferred embodiment of the invention.

Referring now to FIG. 1 of the drawings, there is shown a register junctor RRJ-O, which includes a sensitive test relay TST forming a part of the party and coin detection arrangement of the present invention. A dial-pulse repeating relay 10A also forms a part of the detection arrangement and serves the dual function of following dial pulses received via the tip and ring leads TO and TR to the calling line and of utilizing its windings as a current-limiting resistance during a detection operation. As hereinafter described in greater detail, during a detection operation, negative battery potential is connected through the winding of the relay 10A directly to the tip lead TO to charge the ringer capacitors and any line capacitance toward the potential of the battery for about 20 milliseconds, which is equal to two time slots of the time division multiplex common control equipment. Immediately following the 20 millisecond time interval, the windings of the relay TST are connected in series between the windings of the relay 10A and the lead TO to detect the presence or absence of a ground potential at the subscriber's station during a break period in dialing, whereby the operation of relay TST to ground via lead TO indicates that party number two of a two party line has initiated a call where party identification is required, or alternatively indicates that a coin deposit was made where such a detection is required for a paystation call.

In certain paystation calls, an alternate mode of operation of the detection is employed. A coin deposit may be detected by connecting the windings of the relay TST in series between the corresponding windings of the relay 10A and the lead TO and RO, whereby the relay TST operates when the coin deposit is made to cause a ground potential to be connected to the tip side of the line, whereby unequal currents flow through the two windings of the polar relay TST to cause it to operate and thus to identify the coin deposit.

GENERAL SYSTEM DESCRIPTION

Figure 2:
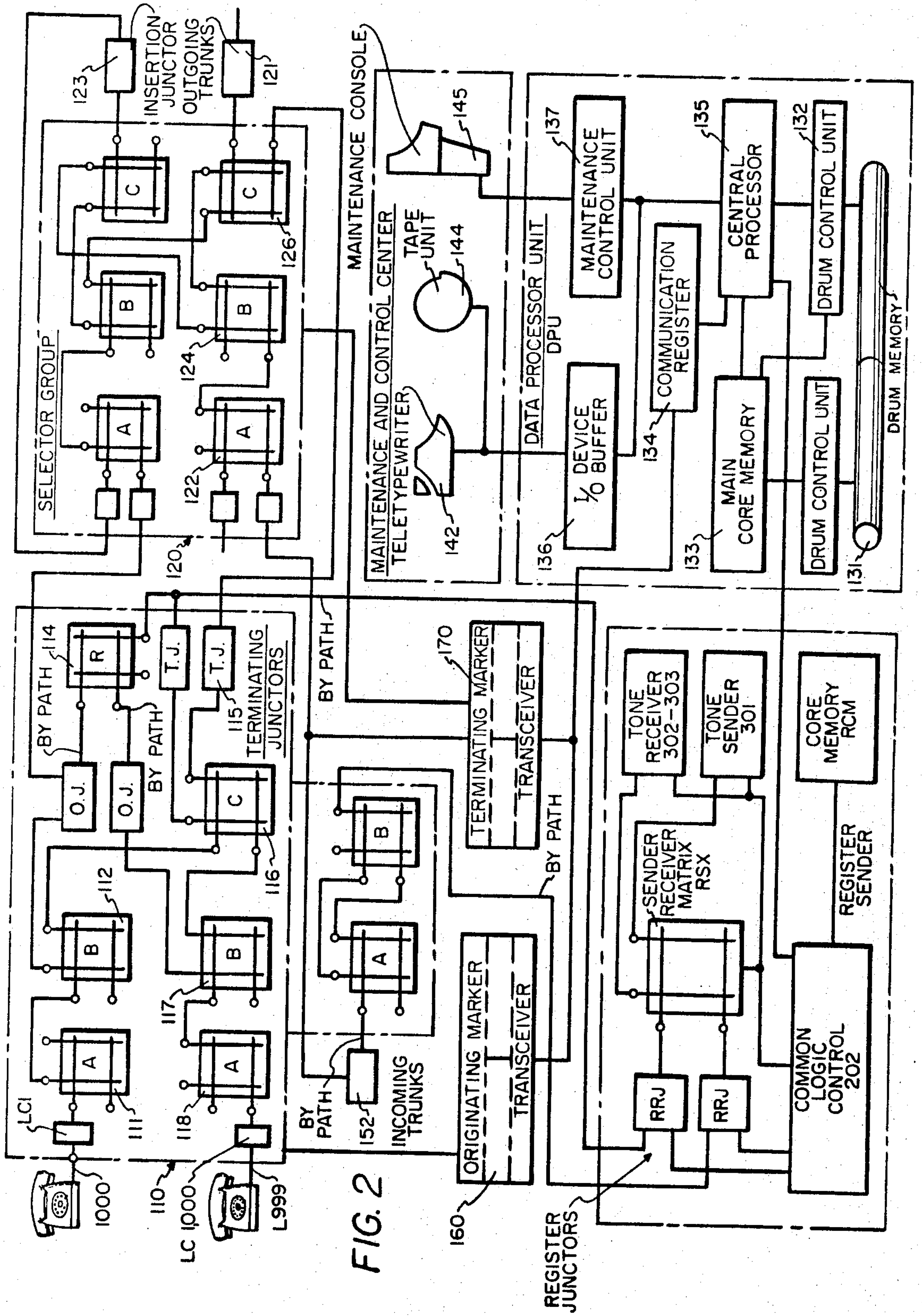
FIG. 2 is a block diagram of a communication switching system incorporating the preferred embodiment of the invention.

The telephone switching system is shown in FIG. 2. The system is disclosed in said REGISTER-SENDER patent application. The system comprises a switching portion comprising a plurality of line groups such as line group 110, a plurality of selector groups such as selector group 120, a plurality of trunk-register groups such as group 150, a plurality of originating markers, such as marker 160, and a plurality of terminating markers such as marker 170; and a control portion which includes register-sender groups such as RS, data processing unit DPU, and a maintenance control sender 140. The line group 110 includes reed-relay switching network stages A, B, C and R for providing local lines L000–L999 with a means of accessing the system for originating calls and for providing a means of terminating calls destined for local customers. The trunk-register group 150 also includes reedrelay switching networks A and B to provide access for incoming trunks 152 to connect them to the register-sender, the trunks also being connected to selector inlets. The selector group 120 forms an intermediate switch and may be considered the call distribution center of the system, which routes calls appearing on its inlets from line groups or from incoming trunks to appropriate destinations, such as local lines or outgoing trunks to other offices, by way of reed-relay switching stages A, B and C. Thus the line group 110, the trunk-register groups 150, and the selector group 120 form the switching network for this system and provide full-metallic paths through the office for signaling and transmission.

The originating marker 160 provides high-speed control of the switching network to connect calls entering the system to the register-sender 200. The terminating markers 160 control the switching networks of the selector group 120 for establishing connections therethrough; and if a call is to be terminated at a local customer's line in the office then the terminating marker sets up a connection through both the selector group 120 and the line group 120 to the local line.

The register-sender RS provides for receiving and storing of incoming digits and for outpulsing digits to distant offices, when required. Incoming digits in the dial pulse mode, in the form of dual tone (touch) calling multifrequency signals from local lines, or in the form of multifrequency signals from incoming trunks are accommodated by the register-sender. A group of register junctors RRJ function as peripheral units as an interface between the switching network and the common logic circuits of the register-sender. The ferrite core memory RCM stores the digital information under the control of a common logic 202. Incoming digits may be supplied from the register junctors via a register receiver matrix RSX and tone recievers 302–303 to a common logic, or may be received in dial pulse mode directly from the register junctors. Digits may be outpulsed by dial pulse generators directly from a register junctor or multifrequency senders 301 which are selectively connected to the register junctors via the sender-receiver matrix RSX. The common logic control 202, and the core memory RCM form the register apparatus of the system, and provide a pool of registers for storing call processing information received via the register-junctors RRJ. The information is stored in the core memory RCM on a time-division multi-plex sequential access basis, and the memory RCM can be accessed by other subsystems such as the data processor unit 130 on a random access basis.

The data processor unit DPU provides stored program computer control for processing calls through the system. Instructions provided by the unit DPU are utilized by the register RS and other subsystems for processing and routing of the call. The unit DPU includes a drum memory 131 for storing, among other information, the equipment number information for translation purposes. A pair of drum control units, such as the unit 132 cooperate with a main core memory 133 and control the drum 131. A central processor 135 accesses the register sender RS and communicates with the main core memory 133 to provide the computer control for processing calls through the system. A communication register 134 transfers information between the central processor and the originating markers 160 and terminating markers 170. An input/output device buffer 136 and a maintenance control unit 137 transfer information from the maintenance control center 140.

The line group 110 in addition to the switching stages includes originating junctors 113 and terminating junctors 115. On an originating call the line group provides concentration from the line terminals to the originating junctor. Each originating junctor provides the split between calling and called parties while the call is being established, thereby providing a separate path for signaling. On a terminating call, the line group 110 provides expansion from the terminating junctors to the called line. The terminating junctors provide ringing control, battery feed, and line supervision for calling and called lines. An originating junctor is used for every call originating from a local line and remains in the connection for the duration of the call. The originating junctor extends the calling line signaling path to the register junctor RRJ of the register-sender RS, and at the same time provides a separate signaling path from the register-sender to the selector group 120 or outpulsing, when required. The originating junctor isolates the calling line until cut-through is effected, at which time the calling party is switched through to the selector group inlet. The originating junctor also provides line lock out. The terminating junctor is used for every call terminating on a local line and remains in the connection for the duration of the call.

The selector group 120 is the equipment group which provides intermediate mixing and distribution of the traffic from various incoming trunks and junctors on its inlets to various outgoing trunks and junctors on its outlets.

The markers used in the system are electronic units which control the selection of idle paths in the establishing of connections through the matrices, as explained more fully in said marker patent application. The originating marker 160 detects calls for service in the line and/or trunk register group 150, and controls the selection of idle paths and the establishment of connections through these groups. On line originated calls, the originating marker detects calls for service in the line matrix, controls path selection between the line and originating junctors and between originating junctors and register junctors. On incoming trunk calls the originating marker 160 detects calls for service in the incoming trunks connected to the trunk register group 150 and controls path selection between the incoming trunks 152 and register junctors RRJ.

The terminating marker 170 controls the selection of idle path in the establishing of connections for terminating calls. The terminating marker 170 closes a matrix access circuit which connects the terminating marker to the selector group 120 containing a call-for-service, and if the call is terminated in a local line, the terminating marker 170 closes another access circuit which in turn connects the marker to the line group 120. The marker con-nects an inlet of the selector group to an idle junctor or trunk circuit. If the call is to an idle line the terminating marker selects an idle terminating junctor and connects it to a line group inlet, as well as connecting it to a selector group inlet. For this purpose the appropriate idle junctor is selected and a path through the line group 110 and the selector group 120 is established.

The data processor unit 130 is the central coordinating unit and communication hub for the system. It is in essence a general purpose computer with special input-output and maintenance features which enable it to process data. The data processing unit includes control of: the originating process communication (receipt of line identity, etc.), the translation operation, route selection, and the terminating process communication. The trans-lation operation includes: class-of-service look-up, inlet-to-directory number translation, matrix outlet-to-matrix inlet trans-lation, code translation and certain special feature translations.

TYPICAL LOCAL LINE-TO-LOCAL LINE CALL

This part presents a simplified explanation of how a basic call is processed by the system. In the following presentations, reed relays are referred to as correeds. Not all of the data processing operations which take place are included. When a customer goes off-hook, the D.C. line loop is closed, causing the line correeds of his line circuit to be operated. This action constitutes seizure of the central office switching equipment, and places a call-for-service.

After an originating marker has identified the calling line equipment number, has preselected an idle path, and has identified the R unit outlet, this information is loaded into the marker communication register and sent to the data processor unit via its communication transceiver.

While sending line number identity (LNI) and route data to the data processor, the marker operates and tests the path from the calling line to the register junctor. The closed loop from the calling station operates the register junctor pulsing relay, contacts of this relay are coupled to a multiplex pulsing highway.

The data processor unit, upon being informed of a call origination, enters the originating phase.

As previously stated, the "data frame" (block of information) sent by the marker includes the equipment identity of the originator, originating junctor and register junctor, plus control and status information. The control and status information is used by the data processor control program in selecting the proper function to be performed on the data frame.

The data processor analyzes the data frame sent to it, and from it determines the register junctor identity. A register junctor translation is required because there is no direct relationship between the register junctor identity as found by the marker and the actual register junctor identity. The register junctor number specifies a unique cell of storage in the core memories of both the register-sender and the data processor, and is used to identify the call as it is processed by the remaining call processing programs.

Once the register junctor identity is known, the data frame is stored in the data processor's call history table (addressed by register junctor number), and the register-sender is notified that an origination has been processed to the specified register junctor.

Upon detecting the pulsing highway and a notification from the data processor that an origination has been processed to the specified register junctor, the central control circuits of the register-sender sets up a hold ground in the register junctor. The marker, after observing the register junctor hold ground and that the network is holding, disconnects from the matrix. The entire marker operation takes approximately 75 milliseconds.

Following the register junctor translation, the data processor performs a class-of-service translation. Included in the class-of-service is information concerning party test, coin test, type of ready-to-receive signaling such as dial tone required, type of receiver (if any) required, billing and routing, customer special features, and control information used by the digit analysis and terminating phase of the call processing function. The control information indicates total number of digits to be received before requesting the first dialed pattern translation, pattern recognition field of special prefix or access codes, etc.

The class-of-service translation is initiated by the same marker-to-data processor data frame that initiated the register junctor translation, and consists of retrieving from drum memory the originating class-of-service data by an associative search, keyed on the originator's LNI (line number identity). Part of the class-of-service information is stored in the call history table (in the data processor unit core memory), and part of it is transferred to the register-sender core memory where it is used to control the register junctor.

Before the transfer of data to the register-sender memory takes place, the class-of-service information is first analyzed to see if special action is required (e.g., non-dial lines or blocked originations). The register junctor is informed of any special services the call it is handling must have. This is accomplished by the data processor loading the results of the class-of-service translation into the register-sender memory words associated with the register junctor.

After a tone receiver connection (if required), the register junctor returns dial tone and the customer proceeds to key (touch calling telephone sets) or dial the directory number of the desired party. (Party test on ANI lines is performed at this time.)

The register junctor pulse repeating correed follows the incoming pulses (dial pulse call assumed), and repeats them to the register-sender central control circuit (via a lead multiplex). The accumulated digits are stored in the register-sender core memory.

In this example, a local line without special features is assumed. The register-sender requests a translation after collecting the first three digits. At this point, the data processor enters the second major phase of the call processing function - the digit analysis phase.

The digit analysis phase includes all functions that are performed on incoming digits in order to provide a route for the terminating process phase of the call processing function. The major inputs for this phase are the dialed digits received by the register-sender and the originator's class-of-service which was retrieved and stored in the call history table by the originating process phase. The originating class-of-service and the routing plan that is in effect is used to access the correct data tables and provide the proper interpretation of the dialed digits and the proper route for local terminating (this example) or outgoing calls.

Since a local-to-local call is being described (assumed), the data processor will instruct the register-sender to accumulate a total of seven digits and request a second translation. The register-sender continues collecting and storing the incoming digits until a total of seven digits have been stored. At this point, the register-sender requests a second translation from the data processor.

For this call, the second translation is the final translation, the result of which will be the necessary instructions to switch the call through to its destination. This information is assembled in the dedicated call history table in the data processor core memory. Control is transferred to the terminating process phase.

The terminating process phase is the third (and final) major phase of the call processing function. Sufficient information is gathered to instruct the terminating marker to establish a path from the selector matrix inlet to either a terminating local line (this example) or a trunk group. This information plus control information (e.g. ringing code) is sent to the terminating marker.

On receipt of a response from the terminating marker, indicating its attempt to establish the connection was successful, the data processor instructs the register-sender to cut through the originating junctor and disconnect on local calls (or begin sending on trunk calls). The disconnect of the register-sender completes the data processor call processing function. The following paragraphs describe the three-way interworking of the data processor, terminating marker, and the register-sender as the data frame is sent to the terminating marker, the call is forwarded to the called party and terminated.

A check is made of the idle state of the data processor communication register, and a terminating marker. If both are idle, the data processor writes into register-sender core memory that this register junctor is working with a terminating marker. All routing information is then loaded into the communication register and sent to the terminating marker in a serial communication.

The register-sender now monitors the ST lead (not shown) to the network, awaiting a ground to be provided by the terminating marker.

The marker checks the called line to see if it is idle. If it is idle, the marker continues its operation. These operations include the pulling and holding of a connection from the originating junctor to the called line via the selector matrix, a terminating junctor, and the line matrix.

Upon receipt of the ground signal on the ST lead from the terminating marker, the register-sender returns a ground on the ST lead to hold the terminating path to the terminating junctor.

When the operation of the matrices has been verified by the marker, it releases then informs the data processor of the identity of the path and that the connection has been established. The data processor recognizes from the terminating class that no further extension of this call is required. It then addresses the register-sender core memory with instructions to switch the originating path through the originating junctor.

The register junctor signals the originating junctor to switch through and disconnects from the path, releasing the R matrix. The originating junctor remains held by the terminating junctor via the selector matrix. The register-sender clears its associated memory slot and releases itself from the call. The dedicated call history table (for that register) in the data processor core memory is returned to idle.

SYMBOLISM FOR GATES AND BISTABLE DEVICES

The common logic circuits of the register-sender subsystem are generally implemented with integrated circuits, mostly in the form of NAND gates, although some other forms are also used. The showing of the logic in the drawings is simplified by using gate symbols for AND and OR functions, the AND function being indicated by a line across the gate parallel to the input base line, and the OR function being indicated by a diagonal line across the gate. Inversion is indicated by a small circle on either an input or an output lead. The gates are shown as having any number of inputs and outputs, but in actual implementation these would be limited by loading requirements well known in the art. Latches are indicated in the drawing by square functional blocks with inputs designated S and R for set and reset respectively; the circuits being in practice implemented generally by two NAND gates with the output of each connected to an input of the other, which makes the circuit a bistable device. The logic also uses bistable devices in the form of JK flip-flops implemented with integrated circuits.

Relay units such as the register junctors include interface circuits for signals to and from the electronic frames. These interface circuits are relay drivers and test gates as shown for example at the bottom of FIG. 1. These circuits use discrete transistors rather than integrated circuits. Relay drivers shown as triangles function as switches to operate the relays. Those designated MGS are main ground switches comprising two transistors connected so that when a true signal is applied at the input, ground potential from the main battery is connected via the emitter-collector path of the output stage in saturation to a relay; those designated MBS are main battery switches connected so that with a true signal at the input the negative terminal of the main battery is connected via the emitter-collector path of the output stage in saturation to a relay; those designated FRS are fast-release relay switches comprising two transistors such that when a true signal is applied to the input the two output leads from the collectors of two transistors connected to the two sides of the relay winding supply a low impedance path to operate the relay; and those designated LBS for low current battery switch comprise a single transistor which when a true signal is applied at the input supply a low impedance path including the collector-emitter path to operate the relay. The contact test gate designated by CTG is a circuit which when ground is supplied via relay contacts at its input supplies a true signal at its output.

REGISTER JUNCTOR AND ORIGINATING PATH

A diagram of a register junctor RRJ-O is shown in FIG. 1, and an originating path may be traced through the diagram of the system in FIG. 2.

The originating path is a connection in a line group between a calling line to a register junctor and to a selector inlet. Referring now to FIG. 2, the path includes one line circuit LC1, one A stage crosspoint 111, one B stage crosspoint 112, an originating junctor 113, and one R matrix crosspoint 114. The originating junctor includes a hold relay, a cut-through relay, and a lockout relay.

The register junctor's function is the interface between the subscriber lines and incoming trunks, and the time-shared circuits of the register-sender. The register junctors are used for digit receiving or sending, tone application, a battery feed device to the calling station, party and coin testing, busy and idle indication to the originating marker, and as a source of hold for the matrix path.

There are two types of register junctors, the local register junctors used with the R stage outlet to subscriber lines and paystations, and incoming register junctors used with incoming trunks and having less complexities than the local register junctors.

The register junctor RRJ-O shown in FIG. 1 is a local register junctor. Only pertinent portions of the register junctor are described herein, but reference may be made to the SYSTEM application for a more complete description thereof.

Relay 10H is a reed relay (correed). It is energized by the originating marker applying ground potential to the HR lead. Contacts of this relay connect the tip and ring leads TO and RO to relay 10A, close a path to operate relay BY, which in turn has contacts to apply ground to the IT lead and via a path not shown lights a busy lamp. Contacts of relay 10H also supply ground potential to lead H to hold the originating connection. Relay 10H releases after the register-sender receives specific instructions from the data processing unit that the terminating marker has completed its functions which will cause the register junctor to eventually be released.

Relay 10A is a single reed relay with three windings, as disclosed in said BATTERY FEED RELAY patent and as hereinafter described in connection with FIG. 3 of the drawings. Two of the windings are connected to battery and ground potential during dialing and in series during a party or coin test, while the third is not actively used. Relay 10A is operated under the control of the subscriber loop (or trunk) via the tip and ring leads. After relay 10H has operated connecting the register junctor to the subscriber line, with the telephone at the subscriber station off-hook closing the path between the TO and RO leads, relay 10A operates. Contacts of this relay supply ground to a contact test gate 1010, which generates a true signal on lead PHM (pulsing highway) which via the multiplex circuits is supplied to the succeeding common equipment. During the reception of dialed digits relay 10A follows the dial pulses which are therefore repeated via lead PHM to the common logic circuits. Relay 10A is also used in conjunction with relay TST during a party or coin test, and operates if there is a ground on the tip lead at the subscriber station. When relay 10H releases during sequence state PSS=13, which is hereinafter described, relay 10A is also released.

Relay 10CT is a reed relay, and is controlled by the TSC (test sequence counter) in memory. It is operated for 10 milliseconds while performing a coin test or party test. While it is operated it includes the TST relay in the test path from the relay 10A and source battery, to the ground provided for the subscriber equipment.

Relay PT shown in FIG. 1 as a single relay actually comprises two mercury wetted reed relays in parallel, operated by the same fast release relay switch 1007 under control of a signal on lead PTM. They are operated for 30 milliseconds for control of the path for coin and party tests.

Relay SP is a reed relay which is used to open a parallel path during coin testing that is possible when testing for coin deposit from a single slot touch calling telephone. Without the path being open a "series" relay (or equivalent) in some (new single slot) coin telephones may not release, thus preventing coin ground from being applied to the tip side of the line. It is operated as a function of the CB bit of memory and TSC having started. It is operated for the same 30 milliseconds as PT during coin test.

Relay TST is a mercury wetted reed relay with three windings. This relay is used for coin deposited test and party two identification. When the test is not being made two of the windings are shorted out by contacts of relay 10CT. The third winding is constantly active giving a reverse-bias in the relay so that any contact switch bounce or stray potential will not operate relay TST giving a false indication.

PARTY AND COIN DETECTION OPERATION (FIG. 1)

Referring now to FIG. 1 of the drawings, a party identification test of a two party line will now be described, where the telephone sets are equipped with dials. Two-party lines require some type of identification scheme, whereby party number one and party number two can be identified during a call for billing purposes. Party number two is identified by the presence of a high-resistance ground potential connected to the tip lead of the calling line during the open period of the dial impulse springs (not shown). The absence of a ground potential indicates a call initiated by party number two.

The party-identifying ground potential is connected through a 3000 ohm resistor (not shown) and one of the dial shunt springs to the tip side of the line so that with the dial off-normal, ground is connected through the resistor and the shunt springs to the tip lead. Thus, the ground signal is only present during the off-normal time of the dial, and is removed during the talking interval of time to avoid having a non-inductive resistance on one side of the line causing an unbalanced line condition.

The party number two identification is performed in the register junctor by means of the sensitive polar relay TST, which is connected to the tip side of the line during the first break period of dialing and which operates from ground through the 3000 ohm party two resistor and about 1000 ohms of line resistance. The relay TST is designed so that it does not operate from a 13,000 ohm line lead resistance to ground.

Considering now a typical party detection operation, assuming that party number two has initiated a call by establishing an originating path to the register junctor RRJ-O, the relay 10H operates and connects the subscriber's line via the preceding equipment including the originating path to the relay 10A, whereby the subscriber's closed loop causes the relay 10A to operate. When the subscriber moves the dial off-normal to commence dialing, the off-normal shunt springs of the dial close to ground the tip side of the line through the 3000 ohm resistor. The pulse springs of the dial thereafter open for the first break pulse to cause the relay 10A to release. With the pulse springs open, the subsequent common equipment is alerted to the fact that the first break period has commenced via a signal over lead PHM (the pulse highway). As a result, the common equipment causes the relay PT to operate in response to a signal received via the lead PTM as hereinafter described in greater detail. After operating, the relay PT connects the windings of the relay 10A and the windings of the relay TST in series to the lead TO and thus to the tip side of the calling line via the originating path, the windings of the relay TST being temporarily bypassed by the normally-closed contacts of the relay 10CT. As a result, the ringer capacitors and the line capacitance connected to the tip side of the line are charged toward the potential of the battery connected to the lower section of one winding of the relay 10A via a path including the negative battery terminal, one winding of the relay 10A, the normally-closed bypass contacts of the relay 10CT, the transfer contacts of the relay PT, the other winding of the relay 10A, the other normally-closed bypass contacts of the relay 10CT, and the lead TO to the tip side of the calling line, whereby current flows through the ringer and line capacitance and through the 3000 ohm resistor. The relay 10A does not operate since its windings are in opposition, but its windings serve as a current limiting resistance. After a predetermined time interval equal to two register time slots of the common equipment (20 milliseconds), the relay 10CT is operated in response to a signal over lead CSTM as hereinafter described in greater detail. The reason for the delay is to permit the ringer and line capacitance to become charged in the event that party number one had initiated the call so as to prevent a transient discharge of the capacitance to operate momentarily the relay TST upon connecting it to the lead TO and thus to produce a false indication to the common equipment.

When relay 10CT operates, it removes the bypass from the windings of the relay TST to permit it to operate to ground through the 3000 ohm resistance at the telephone set of party number two, whereby a signal is returned to the common equipment via lead TSDM. The windings of the relay TST are each of a low resistance, such as 30 ohms, so that the current initially flowing through the 3000 ohm resistor is substantially unaltered after the relay TST is connected into the circuit. After an additional time interval of one register time slot (10 milliseconds), the common equipment responds to the signal present on lead TSDM, thereby identifying party number two. The additional delay is necessary to permit the relay TST to operate, and there-fore the common equipment waits for the duration of one time slot before observing the condition of lead TSDM. If relay TST is operated, the common equipment records the identification of party number two for billing purposes. Thereafter, the succeeding equipment releases both relay 10CT and relay PT to cause the relay 10A to be reconnected to the leads TO and RO so that it can continue to repeat dial pulses, and to cause relay TST, if operated, to restore.

Figures 7, 8, 9, 10:
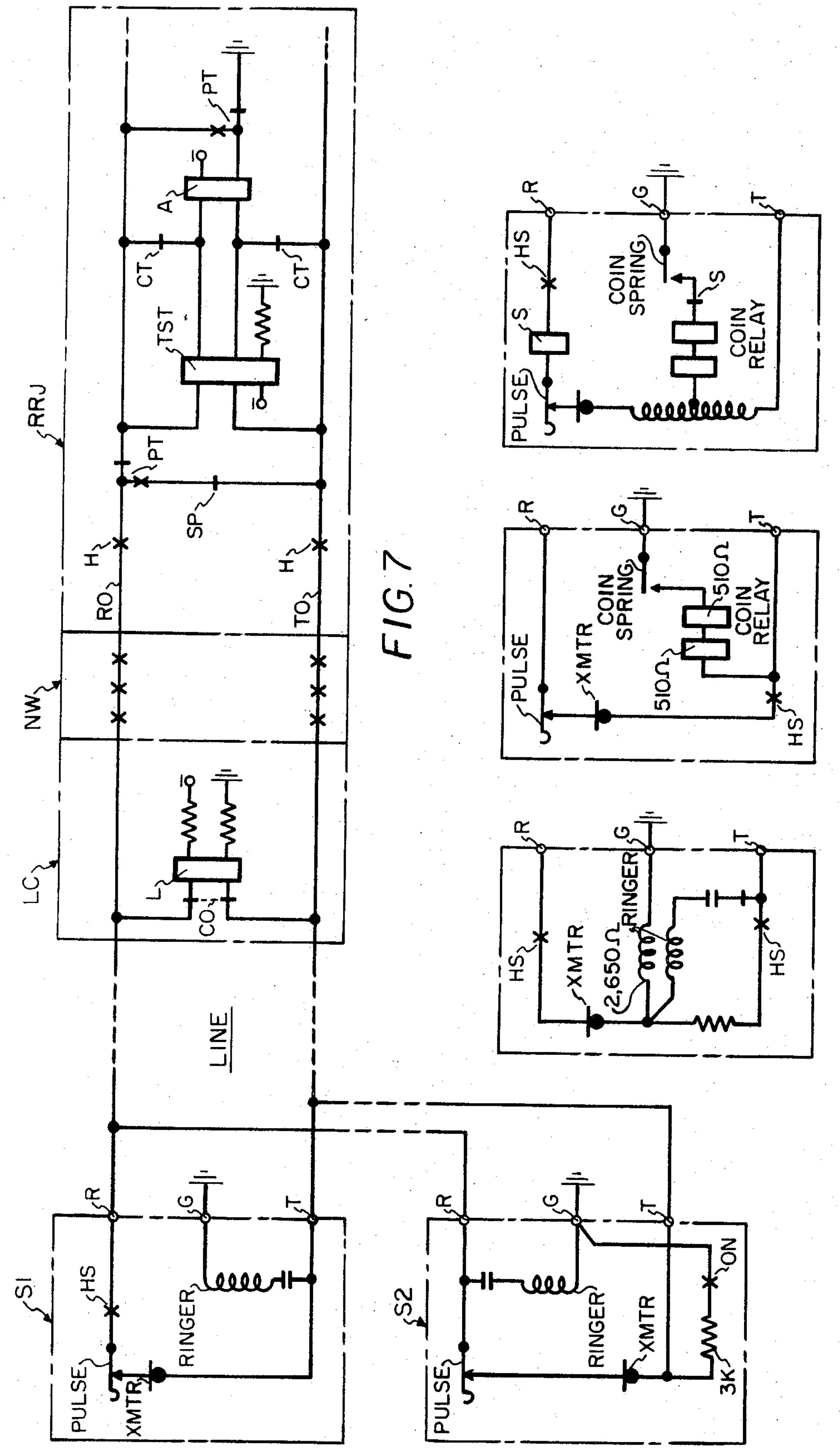
FIG. 7 is a simplified diagram of part of a register junctor and two telephone stations on a rotary dial party line.
FIG. 8 is a simplified diagram of part of a dual tone telephone for party 2.
FIG. 9 is a simplified diagram of part of a multi-slot coin box phone.
FIG. 10 is a simplified diagram of part of a single-slot coin box phone.

FIG. 7 is a simplified diagram of part of a register junctor and two telephones on a rotary party line. In the register junctor the pulsing relay is simplified to a two-winding form. The line has an individual line circuit LC, of which only the line relay L and contacts of a cutoff relay CO are shown. During a call the line is connected to the register junctor via the switching network NW. The telephone set S1 of the first party has a ringer connected via a capacitor to the tip side T of the line. The telephone set also includes hookswitch contacts HS, pulsing springs PULSE of the rotary dial, a carbon transmitter XMTR, and other components not shown. The telephone set S2 for the second party is similar except that the ringer is connected to the ring side R of the line, and the 3000 ohm identification resistor is connected from the tip side of the line via dial offnormal contacts ON to ground. Each party may also have several extension sets with their ringers capacitively connected to the same side of the line.

Another problem in party identification involves the ringer capacitors connected to the ring side of the line (this side of the line is connected via the switching network to lead RO in FIG. 1). For the party two telephone set, when it is off-hook there is a path from the ring side of the line via the hook-switch contacts and the pulsing springs to the tip side; and when the dial is off normal the tip side is further connected via a set of off normal contacts and the 3000-ohm resistor to ground. When the pulsing springs open the ringer capacitors on the ring side of the line charge to a voltage which may be −50, or sometimes as high as −75 volts. The pulsing springs may reclose at the same time that relay TST is connected, causing the ring side ringer capacitors to be connected at the telephone set to the 3000-ohm resistor, thereby reducing the current that can flow through relay TST until these ringer capacitors are discharged; which may in some cases, particularly with a fast dial, prevent relay TST from operating. The solution to this problem as shown In FIG. 1 is provided by a set of make contacts of relay PT in series with break contacts of relay SP providing a short circuit path between leads RO and TO; which provides a discharge path for the ring side ringer capacitors via the two sides of the line to the 3000-ohm resistor, thereby eliminating the undesirable discharge from the ring to tip side of the line within the telephone set via the pulse springs.

Considering now a party identification test for a two party line, where the telephone sets are equipped for dual tone (touch) calling multifrequency signals. The party number two identification in this case is made by means of a continuous off-hook, party-identifying ground potential connected through a high impedance inductor such as one having 2650 ohm D.C. resistance as shown in FIG. 8. The reasons for such an inductance are that in this type of telephone set there is no equivalent of the off-normal shunt springs and therefore the identifying ground must be continuosuly connected to the line.

As with dial telephones, in dual tone multifrequency sets party number one is identified by absence of a ground signal, and party number two is identified by a ground potential connected through the inductor, which has a high impedance to A.C. signals. The telephone set is arranged such that in an off-hook condition a 2650 ohm portion of the ringer coil via a center-tap ringer lead (not shown) is connected between ground and the electrical center of the transmission network (not shown). Connecting the ground potential to the electrical center of the network provides a longitudinally balanced condition to prevent noise pick-up from ground currents due to an unbalance in the line. Dial telephones may also be equipped with an inductor in place of the resistor.

Party identification for calls originating from dual tone multifrequency telephones is performed before dial tone is returned, and therefore it is performed before digit sending. The test is not performed during the interdigital pause, because the output of the dual tone multifrequency receivers do not give an indication of when the interdigital interval of the digits being sent, occurs. Attempting to identify a party while tones are being sent could result in the receiver providing an erroneous output.

Dual tone multifrequency party detection operates in the same manner as described for detection of a dial telephone line.

Coin box telephone sets with rotary dials are shown in FIGS. 9 and 10, with a portion of the circuit shown; FIG. 9 being part of the circuit of a multislot phone, and FIG. 10 part of the circuit of a single slot phone.

Considering now a coin deposit test, for a call originated from a dial coin telephone, the common equipment causes a coin test at the first interdigital period. If a coin is not detected, the test is repeated during the second interdigital period; and similarly if not then detected, the test is repeated during the third period. For calls originated from dual tone multifrequency calling coin telephones, the test is started as soon as the common equipment receives an instruction that a coin test is required, after dialing has been completed. The test is done after dialing is completed in order to avoid mutilating dual tone digits.

For a prepay paystation operation a caller must deposit a coin or coins before dialing is allowed except for the case when a special code for "Emergency Service Dialing" is dialed from an office that provides dial tone before coin deposit. A coin actuated spring connects ground potential through the 1020 ohm coin relay to the tip side of the line to indicate coin deposit. Coin deposit is detected in the register junctor as a result of currents flowing through the windings of the polar relay TST.

In operation, the relay 10H of the register junctor is the first relay operated, and connects the relay 10A to the line. The relay 10A operats through the off-hook paystation. After the common equipment receives the class of service translation that indicates a paystation, it operates the relay 10CT, which connects the windings of the TST relay in series with the relay 10A. If the coin has not been deposited, the TST relay does not operate because it has equal, but opposing, current flowing in its two windings.

If dial tone is not to be returned until after coin deposit, the succeeding common equipment may be arranged to continue to wait for the coin test indication on the lead TSDM. With this arrangement, when the coin is deposited, the ground through the coin relay is connected to the line. This 1020 ohm ground signal causes more current to flow in the upper winding and less current to flow in the lower winding of polar relay TST thus allowing it to operate and energize the lead TSDM. When the common equipment recognizes the activated lead it operates the relay BD1 to return dial tone and operates relay 10CT to remove the TST relay from the line.

If dial tone is to be returned before coin deposit, the BD1 and 10CT relays are operated at the same time, i.e., after receipt of the class of service information. Normally, the caller deposits his coin before dialing. The coin deposit causes the line to be grounded as described before which results in operation of the TST relay. Upon recognizing the coin deposit indication, the common equipment releases the 10CT and BD1 relays. If the caller starts dialing before coin deposit, the common equipment waits for the coin test indication until either the coin id deposited or until it can determine if a free code has been dialed.

If dial tone after coin deposit is not required, the coin test for rotary dial paystations, but not for touch calling paystations, is made in the same manner as the party test, i.e., by connecting the TST relay to the tip side of the line at the interdigital pause.

BATTERY FEED RELAY

Figure 3:
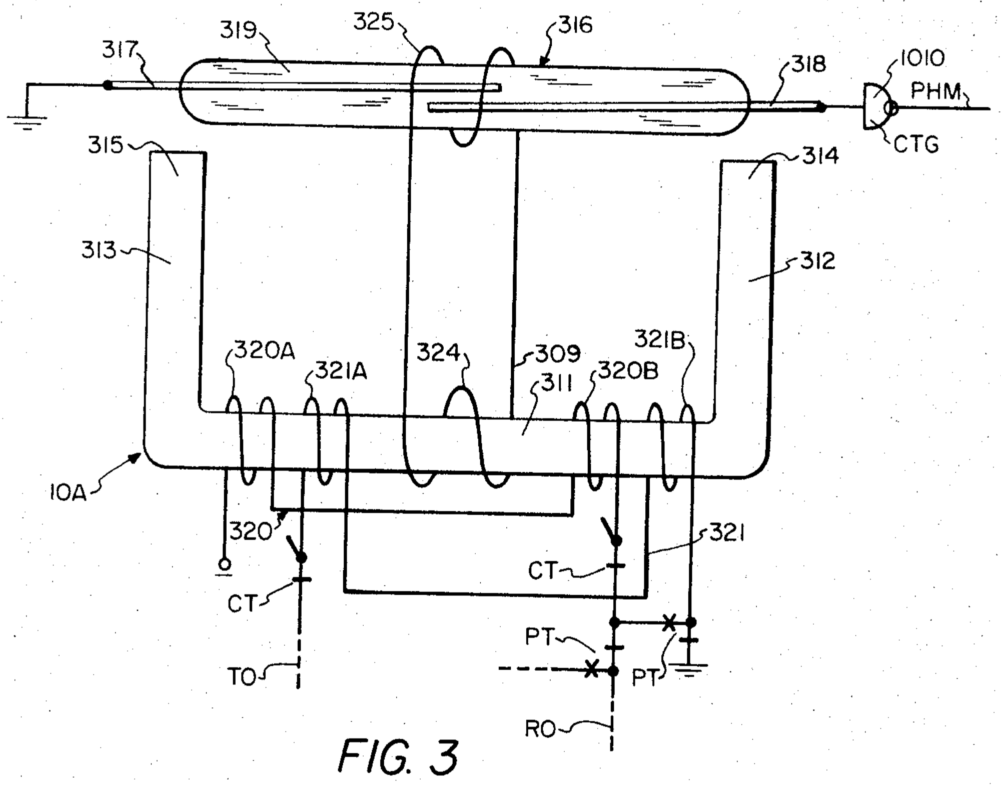
FIG. 3 is a schematic representation of the dial pulse repeating relay having a closed-loop auxiliary winding, illustrating in a simple manner the principle upon which the relay is constructed.

Referring now to FIG. 3, the battery feed relay 10A of FIG. 2 serves the dual function of a battery-feed, pulse-repeating relay and of a current-limiting resistance during party and coin detection operations. The principle of operation of the relay 10A is disclosed in the BATTERY FEED RELAY patent, which may be referred to if additional information is desired. The relay 10A includes an additional or auxiliary winding or coil 309 which aids in the accurate reproduction of dial pulses.

The relay 10A comprises a U-shaped iron core 310 having bight portion 311 and legs 312 and 313. Adjacent the ends 314 and 315 of legs 312 and 313, respectively, is located a reed switch device 316. The reed switch device is of the usual type including a pair of magnetic reed blades 317 and 318, which when subjected to a magnetic field, close to complete the external circuit connected thereto. The blades, as can be seen, are sealed in a closed, insulated chamber 318, normally constructed of a vitreous material. The U-shaped core shown in the drawings is not essential to the invention; however, it is preferred because it provides a better concentration of the magnetic operating field at the reed switch than does a conventional parallel, straight-line core.

A pair of operating coils 320 and 321 wound about the bight comprise pairs of winding portions 320A and 320B and 321A and 321B, respectively, each of the winding portions being wound in the same direction as illustrated in FIG. 3. When the relay 10A is serving to follow dial pulses with the relay PT unoperated and a make portion of a dial pulse occurs, current flows from ground via a path including the PT transfer contacts, the portions 321B and 321A, the normally-closed CT contacts, the lead TO, the preceding equipment and the subscriber's closed loop, the lead RO, the PT transfer contacts, the normally-closed CT contacts, and the portions 320B and 320A to the negative battery terminal to energize the operating coils, which thereby serve to produce, through iron core 310, the necessary magnetic field to operate the reed switch 316. The additional coil 309 which serves as a magnetic coupling means is wound about both the reed switch 316 and the iron core 310, shown here on the bight portion 311, such that upon the energization or de-energization of coils 320 and 321, a change in the magnetic field of core 310 results, which in turn, causes a voltage to be induced into portion 324 of the coil 309. This induced voltage causes current to flow in coil 309, which produces a momentary magnetic field at the tertiary portion 325 thereof, wound about the reed switch 316. The magnetic energy from this momentary field or flux, depending on the sense in which coil 309 is wound about the iron core and the reed switch with respect to the manner in which the operating coils are wound about the core, aids the operating magnetic field created upon the energization of the operating coils. For example, coil 309 is wound about iron core 310 and reed switch 316 in such a manner as to assist the operating magnetic field, the induced momentary magnetic field will cause the reed switch 316 to close more quickly and positively. Furthermore, upon the deenergization of the operating windings, i.e., upon the opening of the subscriber's line, an opposing magnetic field is produced in the manner explained above, which tends to quickly spring the reed blades apart. Thus, through the addition of this extra coil, acting as a magnetic coupling means, a normally open reed switch device which might tend to remain closed upon the deenergization of the operating coils can be made to be opened promptly and efficiently. Thus, the relay 10A accurately and faithfully follows and repeats the dial pulses from the calling line.

When the relay 10A serves as a current limiting resistance during party and coin detection when the relay PT is operated, the winding 320 is connected in series with and in opposition to the other operating winding 321. In this regard, as mentioned in the foregoing description of the register junctor, the transfer contacts of the relay PT connect the operating windings in series to the lead TO.

REGISTER-SENDER MEMORY LAYOUT

The register-sender subsystem includes, as shown in FIG. 2, a core memory RCM, which has 16 word stores individually assigned to each register junctor. Timing control signals are supplied from a timing generator in repetitive cycles, with each register junctor having one time slot per cycle, the time slot timing signals being designated by a prefix Z followed by the junctor number. The time slots are divided into sub-time slots designated by a Y prefix; there being eleven sub-time slot signals designated Y1 through Y11. The memory access arrangement is such that two words are read during a sub-time slot, the information is processed by the common logic circuits, and then these two words are rewritten. The combination of two word stores of memory which are accessed during the same sub-time slot are designated herein as a row of memory. The area of memory comprising eight rows (16 words) individually assigned to one register junctor is referred to as a block of memory.

Figure 4:
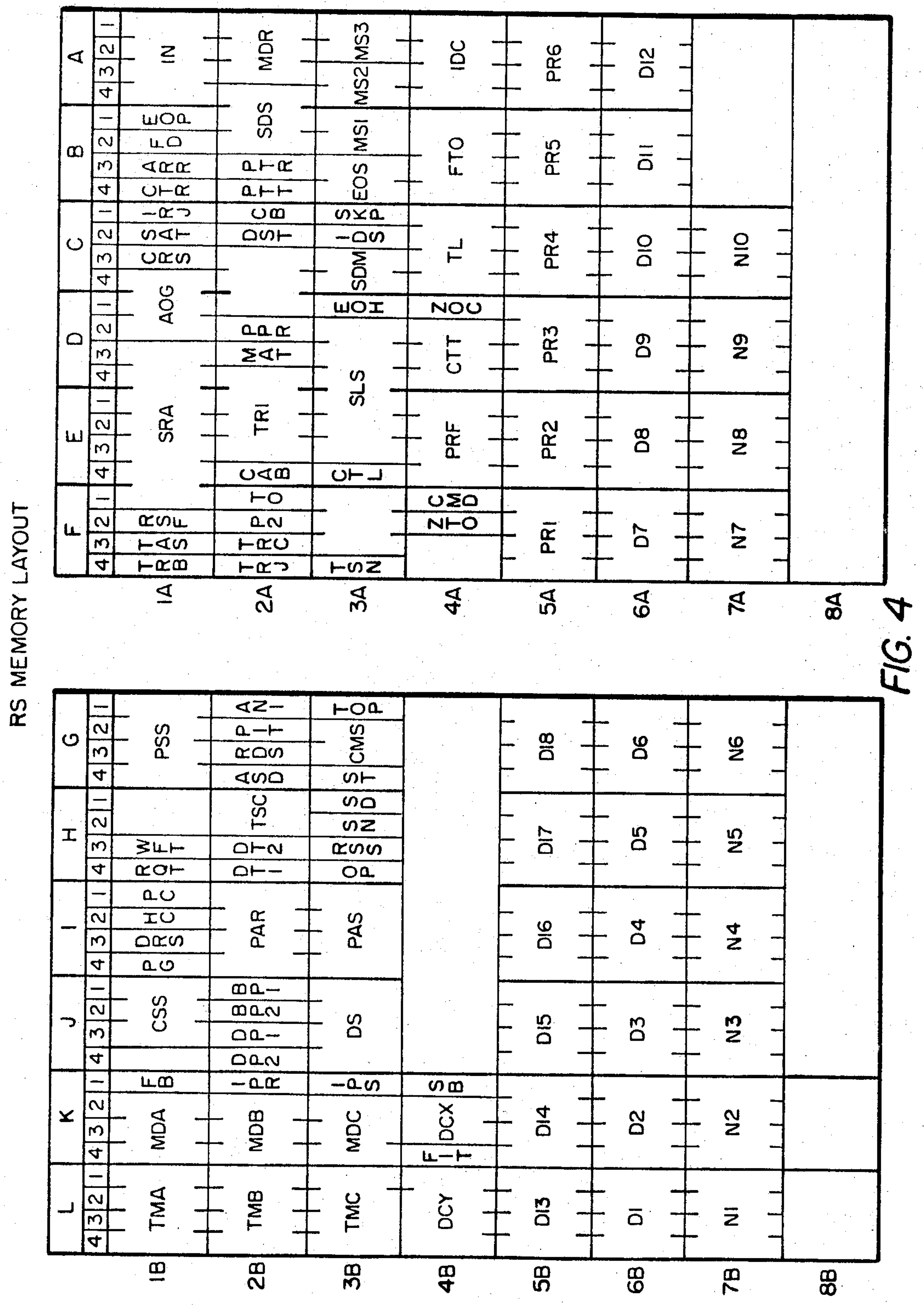
FIG. 4 is a chart showing the arrangement of information stored in the memory of the system shown in FIG. 2.
Figure 6:
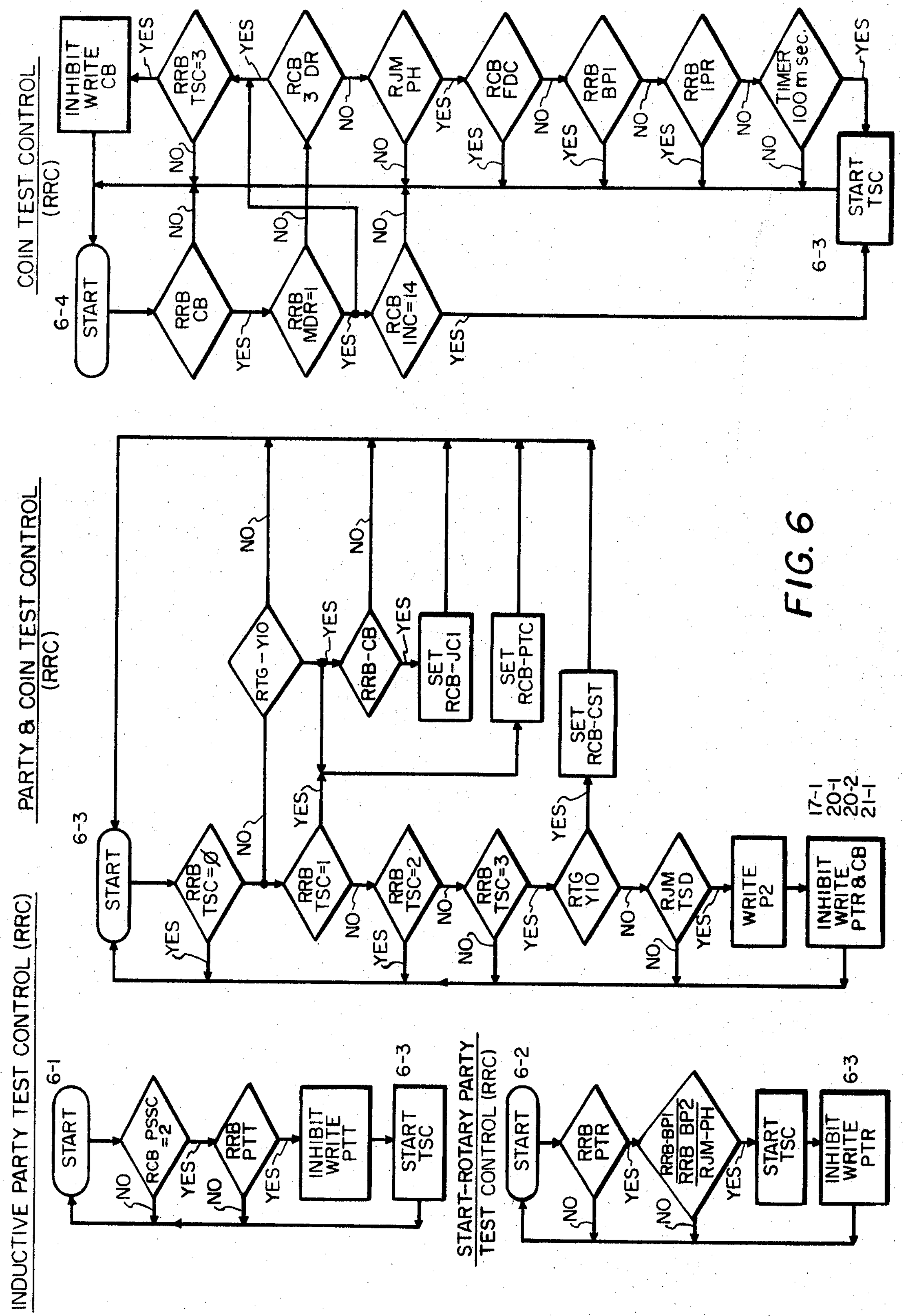
FIG. 6 illustrates flow charts showing the party and coin detection operations of the system shown in FIG. 2.

The memory layout for one block is shown in FIG. 4. Each word store of the memory comprises 26 cores of which 25 are used for bits of call information. As shown in FIG. 4 the two word stores for each row are designated A on the right and B on the left respectively, and each is divided into six positions of four bits each, the positions being designated A-F in word A and G-1 in word B, with the bits numbered 1-4 in each position. Row 1 is used for process control information, row 2 for register control information, row 3 for sending control information, row 4 for translation control and miscellaneous information, rows 5 and 6 for prefix and called number digits, row 7 for calling number digits, and row 8 is a spare.

The scan organization provides for three different modes of scanning. In each mode the first three rows are control rows which are accessed twice during each time slot, row 1 being accessed during sub-time slots Y1 and Y9, row 2 during sub-time slots Y2 and Y10, and row 3 during sub-time slots Y3 and Y11. Row 4 is accessed in every mode during sub-time slot Y4. In mode A rows 5 and 6 are accessed during sub-time slots Y5 and Y6, and then the scan jumps to Y9. In mode B the scan of rows 5 and 6 is skipped so that rows 7 and 8 are accessed with sub-time slots Y7 and Y8 following sub-time slot Y4. Mode C is used for maintenance purposes and uses all 11 of the sub-time slots in sequence, thereby providing a longer than normal time slot interval. Mode A is the normal mode used while receiving or sending called number digits, and mode B is used for receiving or sending calling number identification digits for the processing of a call.

Call processing in the register-sender subsystem is explained in the SYSTEM patent application with reference to the flow charts and equations disclosed therein. The various steps of call processing are controlled by processing sequence states designated PSS, stored in bits G1, G2, G3 and G4 of word 1B, as shown in FIG. 4. During sub-time slot Y1 the states of these four bits are transferred into four carry buffer latches designated PSSC, and the decoded outputs PSSC=0 through PSSC=15 supply the processing sequence state indication during other subtime slots.

In word 2B, bit positions H1 and H2 of the memory, there is stored the word TSC (test sequence counter) which is an internal control field used to control the sequence and operation of relays in the register junctor for conducting the party and coin test. The results of the party or coin test is contained in the P2 field at bit position F2 of word 2A of the memory. The one-bit control field designated CB (coin box) is used to indicate that the call is from a coin box and that a coin test is required, the bit CB being stored in bit C1 of word 2A. A one-bit control field PTT stored in bit B1 of word 2A indicates that a dual-tone multifrequency calling party test is required for a two party line.

CALL PROCESSING (FIG. 6)

Call processing during sequence state PSS=2 returns the start dialing signals (dial tone for local subscriber line or trunk signal for a trunk line). If a touch calling party line is involved the party identification test is initiated.

If the class of service (COS) specifies that the incoming call is from a party line with touch calling, an inductive party test is started as soon as sequence state PSS=2 is stored in the carry buffer.

If a party test for touch calling is required the class of service translation has caused PTT to be true (bit B4 of word 2A). The chart 6-1 and as described in detail in copending REGISTER-SENDER U.S. patent application, RRC equation 23 represent the response to this condition. The RRC equations (section K2*c* of the last mentioned patent application) START TSC, ADD 1-TSC and ROW2-H1 then cause bit H1 in word 2B to be written which makes the TSC field (test sequence counter) to have the value TSC=1. The RRC equations 23 and ROW2-B4 also causes an inhibit of writing PTT.

The RRC equations ADD 1-TSC, ROW2-H1, and ROW2-H2 cause the value of the TSC field to be advanced by a count of 1 each cycle every 10 milliseconds.

The chart 6-3 shows the party and coin test control. With TSC not zero, the RRC equation SET RCB-PTC (section K2b of the last mentioned patent application) along with the RCB equation SET-PTC cause the latch PTC of the carry buffer to be set during sub-time slot Y10 via gate 596 of FIG. 5. Setting of the PTC latch delays generation of a "totals" interrupt for 10 milliseconds for the case of a coin test for a dual tone calling coin box line. This in turn via the register junctor multiplex latch PTL applies a signal to lead PTM to the register junctor to operate the relay PT.

With TSC=3 during sub-time slot Y10, by means of gate 595, the carry buffer latch CST is set which causes operation of the 10CT relay in the register junctor.

If there is an inductive ground on the subscriber's line relay TST in the register junctor will operate.

When relay TST operates the ground potential via its contacts is detected by the CTG circuit 1011 to apply a signal to lead TSDM, which makes the signal RJM-TSD true in the common logic. The RRC equation 27 in conjunction with the RRC equation ROW2-F2 then causes the condition P2 to become true (bit F2 or row 2A).

Coin test is divided into two categories, rotary and dual tone (touch) calling. A dual tone calling pay phone involves a modified post-pay operation or modified semi-pre-pay operation, in that the coin test is made after the last digit is detected. As opposed to all the digits being allowed on the touch calling phone, a rotary pay phone is checked for coin deposit up until the third dialed digit (three digits for emergency numbers, etc.). The coin must be dposited by then to terminate. The operation as shown on chart 6-4 starts with RRC equation 26 for a touch calling coin line or equation 25 for a rotary coin line. The condition CB (coin box, bit C1 of word 2A) is set by the data processor as a function of the class of service, and MDR (mode of receiving, bits A1, A2 and A3 of word 2A) has a vaule of MDR=1 for a dual tone calling line or MDR=0 for a rotary line. the carry buffer latches INC (not shown) are the carry of the instruction field IN from word 1. The value INC=14 is used to instruct the register-sender to make a coin test hunt on a dual tone calling line, and should be given to the register-sender within 200 milliseconds after dialing is complete. The carry buffer latch 3DR (not shown) is set after three digits are received. After start TSC, the test proceeds as in the party and coin test control chart 6-3. After the test, RRC equation 28 inhibits the writing of CB condition, and thus prevents any further coin tests.

Sequence state PSS=3 is the time during which incoming digits are normally received and stored in memory, but in some cases digits may also be received during other sequence states. With a rotary dial at a local subscriber station, the line loop to the register junctor via leads RO and TO when closed operates relay 10A, which applies a signal to the lead PHM via the multiplex circuits, detected in the common logic as a true signal RJM-PH. This signal condition is the make period during dialing. When the line loop to the register junctor via leads RO and TO is opened (the break period) relay 10A releases, and via lead PHM and the multiplex circuits the signal condition RJM-PH in the logic common circuits becomes false. As long as the line loop is closed and RJM-PH is true, no action has occurred. At the beginning of the break period the conditions are RJM-PH not true; BP1, BP2, DP1 and DP2 in position J of row 2 are all false; and if no coin or party test has been initiated TSC=0 is true. With these conditions the signal BP1 is written into memory bit J1 of word 2.

Rotary party test is initiated if during the class of service translation the data processor has placed the condition PTR in bit B3 of word 2. The chart 6-2 entitled Start Rotary Party Test Control corresponds to RRC equation 24. This condition inhibits the writing of condition PTR and starts the party test by starting TSC. The test then proceeds as described above for a dual tone multifrequency party line, with the test relay TST in the register junctor testing for resistance ground, which is applied at the subscriber station for party two.

SUMMARY OF EQUATIONS FOR PARTY AND COIN TESTING

Note that one of the bits PTR, PTT or CB in bits B3, B4, and C1 of row 2 may be set by the data processor during the class of service translation. Relevant register controller RRC equations for party and coin testing are as follows:

1. Write BP1 = $\overline{\text{(RJM-PH)}}\overline{\text{(RRB-BP1)}}$(RRB-TSC=0)(RTG-Y2)$\overline{\text{(RRB-PPR)}}$ Start Timer
7. Write IPR = (RJM-PH)$\overline{\text{(RRB-BP1)}}\overline{\text{(RCB-FDC)}}\overline{\text{(RRB-IPR)}}$ etc. (TIM=100 MSEC)(RTG-Y2)
23. Inhibit Write PTT = (RCB-PSSC=2)(RRB-PTT)(RTG-Y2) Start TSC
24. Inhibit Write PTR = (RRB-PTR)(RRB-BP1)$\overline{\text{(RRB-BP2)}}$(RRB-PH)(RTG-Y2) Start TSC
25. Start TSC = (7)(RRB-CB)$\overline{\text{(RRB-MDR=1)}}$(RTG-Y2)
26. Start TSC = (RRB-MDR=1)(RRB-CB)(RCB-INC=14)(RTG-Y2)
27. Write P2 = (RRB-TSC=3)(RJM-TSD)(RTG-Y2)
   Inhibit Write PTR
   Inhibit Write CB
28. Inhibit Write CB = [(RCB-3DR)(RRB-TSC=3)] + [(RRB-TSC=3)(RRB-MDR=1)]

Start TSC = (23 + 24 = 25 + 26)(RTG-Y2)

ADD 1-TSC = (Start TSC + RRB-H1 + RRB-H2)(RTG-Y2)

ROW 2-B3 = (RRB-B3)($\overline{24}$)

ROW 2-B4 = (RRB-B4)($\overline{23}$)

ROW 2-C1 = (RRB-C1)($\overline{27}$)($\overline{28}$)

ROW 2-F2 = (RRB-F2) + (27)

ROW 2-H1 = [(ADD 1-TSC)$\overline{\text{(RRB-H1)}}$] + [($\overline{\text{ADD 1-TSC}}$)(RRB-H1)]

ROW 2-H2 = [(ADD 1-TSC)(RRB-H1)$\overline{\text{(RRB-H2)}}$] + [(ADD 1-TSC)(RRB-H1)(RRB-H2)]

ROW 2-J1 = ($\overline{6}$) (RRB-J1 + 1)

SET-PTC = [$\overline{\text{(RRC-TSC=0)}}$(RTG-Y10)] + [(RRC-TSC=1)(RTG-Y2)]

SET-CST = [(RRC-TSC=3)(RTG-Y10)] + . . .

SET-JC1 = [$\overline{\text{(RRB-TSC =0)}}$(RRB-C1)(RTG-Y10)] + . . .

For rotary party test PTR is true, and the test is made during the first break interval of the first dialed digit. Equation 1 writes BP1 in response to RJM-PH becoming flase. In the next cycle equation 24 is effective to inhibit write PTR and to start TSC, enabling ADD 1-TSC to write bit RRB-H1 making TSC=1; and in sub-time slot Y10 of the same cycle the carry buffer latch PTC is set so that relay PT in the junctor operates. Two cycles later with PSC=3 the carry buffer latch CST is set during sub-time slot Y10. In the next cycle if the test relay is operated indicating party two, equation 27 causes the P2 bit to be written into row 2-F2. At the same time the test sequence counter advances from TSC=3 to TSC=0, so that in sub-time slot Y10 the carry buffer latches PTC and CST are not set.

The party test for dual tone multifrequency lines is made before dialing commences, and is initiated with equation 23, as already described.

The coin test for rotary dial lines is made during the interdigital pauses after the first three digits, the interdigital pause being indicated by equation 7, and coin test indicated by equation 25.

The coin test for dual tone multifrequency lines is made after dialing is completed, initiated by equation 26.

The carry buffer latch JC1 is set for the coin test at the same time as latch PTC, to operate relay SP in the junctor to remove the short between leads TO and RO, so that a series relay S (FIG. 10) at the telephone station apparatus may release.

MULTIPLEX TO REGISTER JUNCTORS

Figure 5:
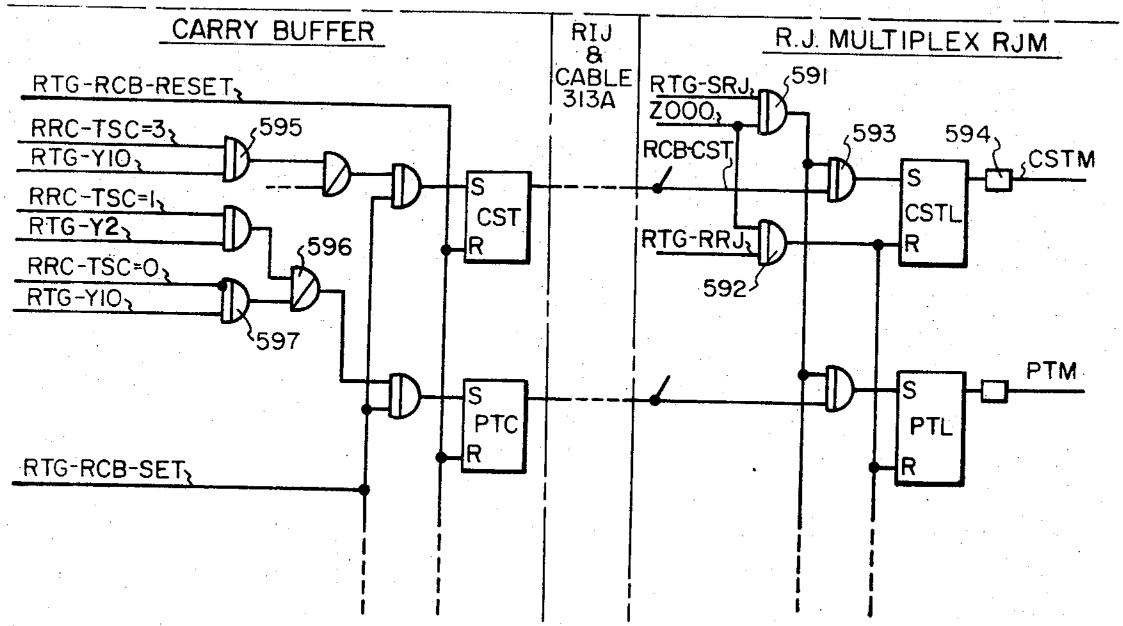
FIG. 5 is a simplified functional block diagram of a portion of the carry buffer, and a corresponding portion of the register junctor multiplex circuits.

A portion of the multiplex circuits are in the unit RJM shown in simplified form in FIG. 5, together with a portion of carry buffer. The connections between the groups in RJM and a unit RIJ are via conductors in the set of cables 313A, which comprise DC links having cable drivers at the input end and cable receivers at the output end. The junctor multiplex circuits RJM are shown in simplified form in FIG. 5 herein. The time slot signals for RRJ-0 are simplified to show Z000 in place of ZA0, ZB0 and ZC0, and the address selection gating is simplified to gates 591 and 592.

The connection between unit RJM and each register junctor includes special interface circuits including electronic devices and chokes, these circuits being shown in FIG. 5 by blocks such as 594 having output control leads to the register junctor. For each register junctor there are two scan leads PHM and TSDM shown in FIG. 1, and a plurality of control leads as shown in FIG. 1 in the set of conductors 310, two of which, CSTM and PTM, are pertinent to party and coin detection and are shown in FIG. 5. There are a plurality of control latches individual to each register junctor one for each of the control leads, control latches CSTL and PTL being shown in FIG. 5.

Address conductors from the register timing generator supply the Z signals to select the time slots of the register junctors in sequence and control the multiplex circuits accordingly, each register junctor being scanned during its time slot and its control latches selectively set. The signals RTG-SRJ and RTG-RRJ determine the time interval during each time slot at which the latches may be set and reset. The signal on lead RTG-RRJ is true during coincidence of the signals Y1 and X2 which occurs near the beginning of a time slot, and the signal on lead RTG-RRJ is true during coincidence of the signals Y11 and X5 which occurs near the end of the time slot.

All of the control latches for a particular register junctor are reset near the beginning of its time slot in response to the signal on lead RTG-RRJ. The input control signals are from latches in the carry buffer circuit, which are selectively set at various times during the time slot in accordance with the logical processing. If, for example, the latch supplying lead RCB-CST has been set during this time slot, then the true signal is suppled via the cable link to a gate arrangement, represented in FIG. 5 as gate 593. Near the end of the time slot the signal on lead RTG-SRJ enables gate 593 via gate 591. The output from gate 593 sets the latch CSTL, and its output via interface circuit 594 supplies the signal to lead CSTM, which in the register junctor of FIG. 1 via relay driver 1005 operates relay 10CT when the transfer contacts of the relay TR have not operated. The other control latches and control signals to the register junctor are similarly controlled. Thus it may be seen that if the logical conditions are such that the carry buffer latch is set in successive time slots for a particular register junctor, then the control signal to the register junctor is continuously true except during the time slot itself when the control latch is in the reset condition. This short interruption of the control signal does not affect the relays in the register junctor.

What is claimed is:

1. In a communication switching system having a plurality of register junctors for connection to calling lines to receive call signals;

register apparatus comprising a memory and logic circuits shared on a time division multiplex basis, said memory having sets of storage elements, a plurality of registers individually associated with said register junctors, each register comprising a block with a given number of said sets, a source of cyclically recurring pulses supplied to the memory, a multiplex arrangement associating each register with an individual pulse time slot during which the stored information is recirculated and may be selectively modified by means of the logic circuits, call signal information being received by the logic circuits from the register junctors during the associated time slots for storage in the memory;

said call signals including party and coin detection signals, each one of said register junctors including a source of current, connecting means for coupling the output of said source to one of said calling lines for at least a predetermined time interval to charge any capacitance connected to said line toward the potential of said source of current, indicating means adapted to respond to said detection signals, and test means for connecting said indicating means to said one of said calling lines after said predetermined time interval to receive one of said detection signals.

2. In a communication switching system, the combination according to claim 1, further including a current limiting device connected in series with said source of current, said indicating means being connected in series with said current limiting device, said test means including bypass switching means being connected in parallel with said indicating means during said predetermined time interval and being disconnected therefrom at the end of said interval.

3. In a communication switching system, the combination according to claim 2, wherein said current limiting device comprises a dial-pulse repeating relay having first and second windings connected between the output terminals of said source and a pair of conductors coupled to a calling line, said connecting means including transfer means for disconnecting said first winding from one of said conductors and for transferring said second winding from its source terminal to the disconnected end of said first winding thereby to connect said first and second windings in series at the beginning of said predetermined time interval, whereby in order to enable said indicating means to operate in an alternate mode, said transfer means can alternatively permit said first winding to remain connected and not transfer said second winding so that said bypass switching means can operate in an alternate mode of operation to connect said indicating means in series with said pulse repeating relay to enable said indicating means to respond to another detection signal alternate to said one of said detection signals.

4. In a communication switching system, the combination according to claim 3 wherein said repeating relay further includes a core about which is wound said first and second windings, a pair of encapsulated switches, and a short-circuited closed-loop auxiliary winding electromagnetically coupling said core and said switches.

5. In a communication switching system, the combination according to claim 4, wherein said indicating means comprises a detection relay having first and second windings connected in parallel with said bypass switching means and in series with the respective first and second windings of said pulse repeating relay, whereby said test relay windings are bypassed during said predetermined time interval and the windings are not bypassed after said time interval.

6. In a communication switching system, the combination according to claim 5, wherein said transfer means comprises a transfer relay operated at the beginning of said predetermined time interval, said relay remaining unoperated during said alternate mode of operation.

7. In a communication switching system, the combination according to claim 6, wherein said bypass switching means comprises a bypass relay operated at the end of said predetermined time interval.

8. In a communication switching system, the combination according to claim 2, wherein said register apparatus includes storage means for storing a signal received from said indicating means and being indicative of said indicating means identifying said one of said detection signals.

9. In a communication switching system, the combination according to claim 8, wherein said register apparatus further includes means effective when the calling line station apparatus units have rotary dials for identifying the first break period of dial pulses from the calling line to cause said connecting means to couple said source to said one or said calling lines.

10. In a communication switching system, the combination according to claim 9, wherein said register apparatus further includes means for causing said test means to connect said indicating means to said one of said calling lines at the end of said predetermined time interval.

11. In a communication switching system, the combination according to claim 10, wherein said predetermined time interval is substantially equal to two register time slots, said register apparatus including means for recording in said memory a signal indicative of said indicating means identifying said one of said detection signals after a succeeding register time slot following said two register time slots.

12. In a communication switching system having a plurality of register junctors for connection to calling lines to receive call signals from station apparatus units connected to said lines, with a common unit for controlling the register junctors; wherein some of said station apparatus units connected to said lines includes means for connecting the line to the ground for a given test; there being capacitance between said lines and ground; and wherein the switching system includes a direct current supply having a supply terminal and a grounded terminal;

detection means in each of said register junctors including a test relay, test initiate means for giving a command from the common unit to a register junctor to operate a test connect device (PT) to couple the line to said supply terminal to charge the capacitance of the line, a test connect means effective after a predetermined time interval to give a command from the common unit to the register junctor to effectively connect the test relay to the line so that it will operate if the calling station apparatus unit on the line has said connection of the line to ground for said given test.

13. In a communication switching system, the combination as claimed in claim 12, wherein said common unit includes test timing means (TSC) which is started in response to said test initiate means, and wherein said test connect means is made effective responsive to the test timing means indicating the end of said predetermined time interval.

14. In a communication switching system, the combination as claimed in claim 13, wherein said capacitance connected to the line includes capacitors for coupling ringers between the line and ground at the respective station apparatus units, wherein said given test is a party test, with the calling line being a party line having party one and party two station apparatus units, with the party two station apparatus unit including a resistor which is connected between one side of the line and ground potential at least during the test;

wherein each register junctor includes a battery feed relay which normally during a call is connected with first winding means between said supply terminal and one side of the line, and second winding means between ground and the other side of the line, with the first and second winding means in series aiding relation so that it is operated when the line loop is closed at the calling station apparatus unit, wherein said test relay includes first winding means and second winding means;

wherein said test connect device comprises a party test relay which connects the winding means of the battery feed relay and the test relay in series between the supply terminal and the line, with the first and second winding means of the battery feed relay in series opposing relation and the first and second winding means of the test relay in series aiding relation;

a shunt control relay (CT) having contacts which shunt the windings of the test relay, the shunt control relay being actuated in response to the test connect command to open its contacts to remove the shunt of the test relay winding means.

15. In a communication switching system, the combination as claimed in claim 14, wherein each station apparatus unit for at least one line includes a rotary dial for transmitting a series of break impulses for each digit of calling signals, the battery feed relay responding by releasing during each break impulse, with contacts of the battery feed relay connected to transmit signals to the common unit, the rotary dial for station two having off-normal contacts which connect resistance between one side of the line and ground for the party test, wherein the test timing means and test initiate means in the common unit are actuated in response to a signal indicating the beginning of a break interval of a dial pulse train, and wherein the common unit includes means effective after the test timing means indicates a further timing interval to give a command to release the party test relay, so that the battery feed relay is reconnected to the line with its windings in series aiding relation to detect the line loop condition during the remainder of the pulse train.

16. In a communication switching system, the combination as claimed in claim 15, wherein the ringer for a party two station apparatus unit is capacitively coupled to said one side of the line, and the ringer for a station one apparatus unit is capacitively coupled to the other side of the line, and wherein said party test relay further includes contacts which connect the two sides of the line together which during the test provides a discharge path for the capacitance on said other side of the line to thereby eliminate the discharge thereof to the party two station apparatus unit and via its test resistor to ground to insure sufficient current flow to the test relay to operate it for the test.

17. In a communication switching system, the combination as claimed in claim 16, wherein in addition to the party lines, there are also coin lines each of which has a coin box station apparatus unit which includes coin springs actuated when coins are deposited to connect ground to the line, and wherein the same detection means is used for calls from coin box lines for a coin test.

18. In a communication switching system, the combination as claimed in claim 17, wherein the register junctors each further include a special relay having normally closed contacts connected in series with the said contacts of the party test relay connected between the two sides of the line, and wherein the common unit during a coin test supplies a command to operate the special relay to thereby open the path between the two sides of the line.

19. In a communication switching system, the combination as claimed in claim 18, further including multiplex apparatus connecting the common unit to the register junctors, with means for effectively connecting the register junctors to the common unit during cyclically recurring individual pulse time slots for transmitting said commands to the register junctors and receiving signals from the register junctors.

20. In a communication switching system, the combination as claimed in claim 12, further including multiplex apparatus connecting the common unit to the register junctors, with means for effectively connecting the register juntors to the common unit during cyclically recurring individual pulse time slots for transmitting said commands to the register junctors and receiving signals from the register junctors.

* * * * *

UNITED STATES PATENT OFFICE
CERTIFICATE OF CORRECTION

Patent No. 3,760,112 Dated 9-18-73

Inventor(s) JOHN E. BUSCH

It is certified that error appears in the above-identified patent and that said Letters Patent are hereby corrected as shown below:

Column 3 line 9, after "Nov. 24, 1971" insert --, now patent No. 3,737,873 issued June 5, 1973,--

Signed and sealed this 12th day of Feruary 1974.

(SEAL)
Attest:

EDWARD M.FLETCHER,JR.
Attesting Officer

C. MARSHALL DANN
Commissioner of Patents